United States Patent Office 3,652,678
Patented Mar. 28, 1972

3,652,678
PROCESS FOR PREPARING PHOSPHOROUS CONTAINING POLYMERS
Keith George Allum, Bagshot, Ronald David Hancock, Thames Ditton, and Peter John Robinson, Twickenham, England, assignors to The British Petroleum Company Limited, London, England
No Drawing. Filed Sept. 25, 1969, Ser. No. 861,177
Claims priority, application Great Britain, Sept. 30, 1968, 46,215/68
Int. Cl. C07f 9/03, 15/00; B01b 11/12
U.S. Cl. 260—606.5 P                    6 Claims

ABSTRACT OF THE DISCLOSURE

Polymers useful as catalyst support materials and containing phosphine groups are prepared by reacting a metal phosphide with a halogen-containing polymer in an inert solvent. Typical halogen-containing polymers are chloromethylated polystyrene, brominated polybutadiene, polyvinyl chloride, polychloroprene and poly(parabromostyrene). The metal phosphide can be an alkali metal phosphide e.g. potassium diphenyl phosphide.

---

The present invention relates to a catalyst support and a process for preparing it. The use of phosphine complexes of transition metals as homogeneous catalysts for a variety of reactions such as carboxylation, hydrogenation and oligomerisation of olefins is known. These catalysts often contain valuable metals, for example palladium and iridium and catalyst recovery and recycle is therefore of great importance. However, it is often a problem to achieve a high degree of catalyst recovery.

We have now discovered that special polymeric supports, themselves containing phosphine groups, can be made which will form macromolecular transition metal complexes in many ways equivalent to the catalysts mentioned above, and which are easier to recover.

Thus according to the present invention there is provided a process for the preparation of a polymer material containing phosphine groups suitable for use as a catalyst support which process comprises reacting, at a temperature in the range —40 to 200° C., in the presence of an inert solvent, a halogen-containing polymer with a metal phosphide of formula:

$$(X_1X_2P)_nR$$

where $X_1$ and $X_2$ can be M, hydrogen atoms, or alkyl or aryl groups containing up to 20 carbon atoms, R is $-R_1P(M)X_3$, M, $-CH_2M$, or $-P(M)X_3$ where M is a metal of Group I-A of the Periodic Table according to Mendeleef, Mg, Mn, Ni or Co and $X_3$ is a hydrogen atom or an alkyl or aryl group containing up to 20 carbon atoms and $-R_1$ is a divalent aromatic or aliphatic group containing up to 20 carbon atoms with the proviso (i) that $n$ is 1 except when R is M in which case $n$ is equal to the valence state of the metal, (ii) when neither of groups $X_1$ and $X_2$ is M then R is M or contains M, but the molecule does not contain more than 2 metal atoms.

The amount of metal phosphide reactant used in the process is usually sufficient to replace all the halogen atoms in the polymer or a stoichiometric excess. However less metal phosphide may be used and useful catalyst supports may be obtained in which not all the halogen has been replaced.

Particularly suitable metal phosphides are those of formula:

(a)  $(X_1X_2P)_nM$
(b)  $X_1PM_2$
(c)  $X_1(M)P-R_1-P(M)X_3$
(d)  $X_1X_2PCH_2M$
(e)  $X_1(M)P-P(M)X_2$ where $X_1X_2X_3$, $R_1$ and M are as defined above.

These metal phosphides may be prepared by methods described by Issleib in Review of Pure and Applied Chemistry 1967, 9, 205–223.

Suitable halogen containing polymers include chloromethylated polystyrene, chloromethylated copolymers of styrene with halogen containing monomers, copolymers of styrene with halogen containing monomers, polyvinyl chloride, copolymers of vinyl chloride with other monomers, chlorinated polyethylene, chlorinated polypropylene, poly(para bromostyrene), polychloroprene, brominated polybutadiene and copolymers of 4-methylpentene-1 and 5-bromopentene-1. The polymers should not contain groups, other than halogen, which react with the phosphorus compound. Preferred polymers are chloromethylated polystyrene, brominated polybutadiene, polyvinyl chloride and poly (para bromostyrene).

Alkali metal phosphides are particularly suitable for the reaction.

The preferred alkali metal phosphides are potassium diphenyl phosphide and dipotassium phenyl phosphide. Phosphides $R_2PM$ and $RPM_2$ where M is Li, Na or K and R is $C_2H_5$, n-$C_4H_9$, cyclo $C_6H_{11}$ or $C_6H_5$ are also suitable.

In a typical case it is thought that the reaction proceeds as follows:

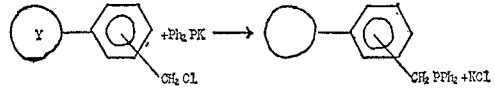

Y represents the backbone ($-CH-CH_2$) of a polystyrene chain.

The preparation is suitably carried out under reflux but as reactivity depends on the halogen atom and the phosphide, temperatures as low as 20° C. or below may sometimes be used.

The preparation is quite straight forward, refluxing is continued until the reaction is complete, which may take an hour or more. The resultant polymer may contain up to 35% wt. phosphorus.

Typical solvents which may be used are diethyl ether, (MeOCH$_2$), Decalin, liquid ammonia, dioxan and toluene.

A preferred solvent is tetrahydrofuran.

Polymers containing phosphorus groups readily co-ordinate to a wide range of transition metal compounds and particularly with compounds of Group VIII metals, to form macromolecular transition metal complexes. Thus metal containing polymers are readily formed by reaction with NiCl$_2$, CoCl$_2$, PdCl$_2$ and PtCl$_2$. Some of the materials are catalytically active and are the subject of copending U.K. application No. 46,217/68. Such catalysts may often be used in conventional heterogeneous flow systems.

The polymers of the present invention may be in certain cases also be used as heat and flame retardant materials, lubricating oil additives (where solubility permits) and sequestrating agents for transition metals in solution.

The molecular weight of the phosphorus containing polymers may vary widely e.g. from about 500 in the case of a polybutadiene up to about 500,000 in the case of polystyrene.

PREPARATION OF PHOSPOROUS-CONTAINING POLYMERS

EXAMPLE 1

(a) 7.8 g. potassium metal (0.2 g. atom) were placed in 100 ml. of tetrahydrofuran under nitrogen in a flask equipped with stirrer, dropping funnel, reflux condenser and gas inlet tube. 22 g. of $Ph_2PCl$ (0.1 mole) in 50 ml. of tetrahydrofuran were added slowly to maintain reflux conditions. The reaction mixture was refluxed for a further hour after the addition was complete. To the refluxing solution 10 g. chloromethylated polystyrene (prepared by the method of Pepper et al., Journal of the Chemical Society 1953, 4097) was added in 0.5 g. batches. The solution was refluxed for one hour. The recovered polymer was washed with methanol, aqueous methanol, and with methanol again before drying. The product was a white solid containing 5.6% wt. phosphorus.

(b) Into a flask flushed with $N_2$ and equipped with a mechanical stirrer, dropping funnel, reflux condenser and nitrogen line was placed dry THF (100 ml.) and potassium metal (7.8 g., 0.2 g. atoms). The flask contents were heated to reflux temperature, whereupon the potassium melted. $(C_6H_5)_2PCl$ (22 g. 0.1 mole) in THF (100 ml.) was cautiously added so as to maintain steady reflux. A red solution was produced. After the addition was complete the reactor contents were heated for a further 2 hours at reflux temperature. 10 g. of polymer as used in (a) above was added in 0.5 g. batches at reflux temperatures. After the addition was complete the reaction mixture was poured into methanol and then filtered. After washing the solid product with aqueous methanol, methanol/acetic acid (10 percent v./v. acetic acid) and finally methanol the material was vacuum dried.

Phosphorus content of product: 5.3% weight. The above procedure was repeated on 3 other occasions yielding products containing 3.9 percent weight phosphorus, 3.6 percent weight phosphorus and 4.4 percent weight phosphorus.

EXAMPLE 2

(a) The preparation of $(C_6H_5)_2PK$ was repeated as described in Example 1. 10 g. of a non-cross-linked chloromethylated polystyrene containing 12 percent weight chlorine prepared from polystyrene by the method of Pepper et al. but using a large volume of inert solvent e.g. cyclohexane were dissolved in THF (100 ml.) and added to the solution of $(C_6H_5)_2PK$ at reflux temperature. The solution was refluxed for 1 hour after the addition was complete and then allowed to cool. The reactor contents were poured into methanol whereupon a white solid was deposited, in small yield. Water (1 litre) was added to the solution and a large quantity of white solid was deposited. The solid product was redissolved in THF and filtered to remove any insoluble material. The filtrate was poured into 50/50 aqueous methanol containing 10 percent v./v. acetic acid. The solid product was again filtered off and redissolved in THF. Precipitation was achieved by pouring into n-heptane. The solid was filtered off and dried.

Phosphorus content of product: 6.2% weight.

(b) The reaction was repeated as above using five times the quantities of reactants. Also a different isolation procedure was adopted as follows:

After the reactor contents had been heated for 1 hour and allowed to cool, water (400 ml.) was added. Two layers separated; the lower aqueous layer was separated off and discarded. The THF layer was poured into heptane. Two layers were produced, and with polymer at the interface. The polymer was filtered off, redissolved in DMF, dialised using DMF. The DMF solution was poured into methanol and the polymer filtered off and dried.

Phosphorus content of product: 4.9% weight.

(c) The reaction was repeated using 12.5 g. of the polymer and the corresponding quantities of other reactants. A different isolation procedure was adopted as follows:

350 ml. of water were added to the reaction flask and the resulting aqueous layer discarded. The THF was then poured into methanol to precipitate. The polymer was then filtered off and dried.

Phosphorus content of product: 6.0% weight.

The above reaction was repeated twice yielding polymers containing 5.5 percent weight phosphorus and 4.7 percent weight phosphorus.

(d) The reaction was repeated as in example (c), but excess $(C_6H_5)_2PK$ was added dropwise to a solution of polymer B in THF.

Phosphorus content of product: 8.5% weight.

EXAMPLE 3

Potassuim diphenyl phosphide was prepared in the manner previously described from 30 g. of potassium and 80 g. of chloro diphenyl phosphine.

20 g. of an insoluble cross linked chloromethylated polystyerne chlorine content=8 percent weight prepared from high surface area cross linked polystyrene and sold under the trade name "Amberlite XAD–2" was added in 5 g. batches at reflux temperature to the solution of $(C_6H_5)_2PK$. The reactor contents were refluxed for 1 hour and a further 20 g. of the polymer added. 250 ml. of water were added to solubilize the potassium chloride produced and to destroy the excess $(C_6H_5)_2PK$. The polymer was filtered off washed with water and THF and dried.

Phosphorus content of product: 2.0% weight.

The reaction was repeated twice yielding products containing 2.3 percent weight phosphorus and 2.1 percent weight phosphorus.

EXAMPLE 4

Potassium diphenyl phosphide was prepared as previously described from 7.8 g. potassium metal and 22 g. of $(C_6H_5)_2PCl$ in THF. 7 g. of polychloroprene dissolved in 300 ml. THF, were added to the refluxing solution of $(C_6H_5)_2PK$. After the addition was complete the solution was refluxed for a further hour and allowed to cool to room temperature. The reactor contents were poured into n-heptane. The solid product was filtered off and redissolved in THF. The solution was filtered to remove insoluble materials. After pouring the filtrate into aqueous methanol and filtering off the solid the polymer was dried.

Phosphorus content of product: 3.0% weight.

EXAMPLE 5

$(C_6H_5)_2PK$ was prepared as previously described from 7.8 g. of potassium and 22 g. $(C_6H_5)_2PCl$ in THF. 10 gm. of poly(para bromostyrene) prepared as described in our copending U.K. application No. 46,217/68 in THF (50 ml.) were added slowly over 1 hour to a refluxing was continued for 6 hours after addition was complete and the solution then allowed to cool. The reactor contents were poured into methanol and the resulting solid filtered off. The polymer was redissolved in THF and filtered to remove insoluble materials. The filtrate was poured into methanol and the polymer filtered off, washed with methanol and dried.

Phosphorus content of product: 3.4% weight.

EXAMPLE 6

Polybutadiene (5 g.) was dissolved with stirring under nitrogen in cyclohexane (500 ml.). Bromine (5 g.) were added slowly at room temperature. After the addition, the reaction mixture was stirred for a further 2 hours. The solid product was filtered off and finally dried. Bromine content=63.6 percent weight.

Potassium diphenyl phosphide was previously described from 7.8 g. of potassium and 22 g. of $(C_6H_5)_2PCl$.

8 g. of the brominated polybutadiene was added in small batches to a refluxing $(C_6H_5)_2PK$ solution. The red colour was discharged. The solution was refluxed for an hour after the addition was complete. The solid was filtered off, washed with methanol, 50/50 aqueous methanol, 10 percent acetic acid in methanol and finally methanol, and dried.

Phosphorus content of product: 6.1% weight.

EXAMPLE 7

(a) Potassium diphenyl phosphide was prepared by previously described technique using 39 g. of potassium and 110 g. of $(C_6H_5)_2PCl$ in 500 ml. dry THF.

25 g. of polyvinyl chloride dissolved in THF (250 ml.), were added to the $(C_6H_5)_2PK$ solution at room temperature. After the addition was complete the solution was stirred for 1 hour. Distilled water (500 ml.) was added and two layers separated. The lower aqueous layer was separated off and discarded. The THF layer was added slowly to n-heptane (3 litres). The white precipitate was filtered off and redissolved in THF. The THF layer was filtered to remove insoluble materials and poured into n-pentane (3 litres). The white solid was filtered off and dried.

Phosphorus content of product: 9.3% weight.

Further quantities of material prepared by this technique had phosphorus contents of 8.8 percent weight, 10.8 percent weight, 10.7 percent weight and 9.7 percent weight.

(b) A series of reactions similar to that described above were carried out in which (i) the polymer solution in THF was added to refluxing potassium diphenyl phosphide solution and (ii) the isolation procedure was varied.

The resulting polymers had phosphorus contents of 4.3 percent weight, 3.4 percent weight, 3.4 percent weight and 5.8 percent weight.

The procedure described in Example 1 part (a) was repeated except polyvinyl chloride was used instead of chloromethylated polystyrene. The product contained 3.5% wt. phosphorus.

EXAMPLE 8

The reaction of dipotassium phenyl phosphide $(C_6H_5PK_2)$ with polyvinyl chloride (a) Into a 2-litre, 3 necked flask equipped with stirrer, nitrogen inlet, dropping funnel and reflux condenser were placed 250 ml. dry tetrahydrofuran and 43.2 g. (1.1 g. atoms) potassium metal. The flask contents were brought to reflux temperature and 50 g. (0.28 mole) dichloro phenyl phosphine in 50 mls. dry tetrahydrofuran added slowly from a dropping funnel. After the addition was complete, the flask contents were refluxed for a further 2–3 hours.

Polyvinyl chloride (35 g.) dissolved in 500 mls. dry tetrahydrofuran was then added. After the addition was complete, the solution was refluxed for a further 3–4 hours during which time the colour changed from red/brown to pale yellow.

After cooling 250 ml. of water were added to the reaction flask to dissolve the potassium chloride. The polymer was precipitated by pouring into pentane and filtered off. The polymer was then Soxhlet extracted with water for 24 hours. Attempts to redissolve the polymer in tetrahydrofuran were unsuccessful and therefore the polymer was subsequently Soxhlet extracted with tetrahydrofuran for 24 hours and finally dried in vacuo.

Phosphorus content=9.6% weight.

(b) A reaction on the same scale and using the same conditions as above was carried out using 16.8 g. of cross-linked polystyrene beads (Amberlite XAD-2) which had been chloromethylated (chlorine content=5.7 wt.). The product was extracted with methanol instead of tetrahydrofuran.

Phosphorus content=2.2% weight.

What we claim is:

1. A process for the preparation of a polymer material containing phosphine groups suitable for use as a catalyst support which process comprises reacting, at a temperature in the range —40° to 200° C., in the presence of an inert solvent, a halogen containing polymer selected from the group consisting of:
   chloromethylated polystyrene;
   a chloromethylated copolymer of styrene with a halogen containing monomer;
   a copolymer of styrene with a halogen containing monomer;
   polyvinyl chloride;
   a copolymer of vinyl chloride with another monomer;
   chlorinated polyethylene;
   chlorinated polypropylene;
   poly(para-bromostyrene);
   polychloroprene;
   brominated polybutadiene; and
   a copolymer of 4-methyl-pentene-1 and 5-bromopentene-1 with an alkali metal phosphide selected from the group consisting of those of the formulae $R_2PM$ or $RPM_2$ wherein M is Li, Na or K and R is $C_2H_5$, n-$C_4H_9$, cyclo-$C_6H_{11}$ or $C_6H_5$.

2. A process as defined in claim 1 wherein said polymer is a chloromethylated polystyrene, brominated polybutadiene, polyvinylchloride, polychloroprene or poly(para-bromostyrene).

3. A process for the preparation of a polymer material containing phosphine groups suitable for use as a catalyst support which process comprises reacting, at a temperature in the range of —40° to 200° C., in the presence of an inert solvent, a halogen containing polymer selected from the group consisting of:
   chloromethylated polystyrene;
   a chloromethylated copolymer of styrene with a halogen containing monomer;
   a copolymer of styrene with a halogen containing monomer;
   polyvinyl chloride;
   a copolymer of vinyl chloride with another monomer;
   chlorinated polyethylene;
   chlorinated polypropylene;
   poly(para bromostyrene);
   polychloroprene;
   brominated polybutadiene; and
   a copolymer of 4-methylpentene-1 and 5-bromopentene-1 with potassium diphenyl phosphide or dipotassium phenyl phosphide.

4. A process as defined in claim 1 wherein said inert solvent is tetrahydrofuran.

5. A process for the preparation of a polymer material containing phosphine groups suitable for use as a catalyst support which process comprises reacting, at a temperature in the range —40° to 200° C., in the presence of an inert solvent, a halogen containing polymer which is a chloromethylated polystyrene, brominated polybutadiene, polyvinyl chloride, polychloroprene or poly(para bromostyrene) with potassium diphenyl phosphide or dipotassium phenyl phosphide.

6. A process as defined in claim 5 wherein said solvent is tetrahydrofuran.

References Cited

UNITED STATES PATENTS

| 3,423,468 | 1/1969 | Zorn et al. | 260—606.5 |
| 3,442,948 | 5/1969 | Wiley | 260—606.5 X |
| 3,502,725 | 3/1970 | Dewhirst et al. | 260—606.5 X |

TOBIAS E. LEVOW, Examiner

W. F. W. BELLAMY, Assistant Examiner

U.S. Cl. X.R.

260—429 R; 252—431 P